(12) United States Patent
Waldron et al.

(10) Patent No.: US 11,912,944 B2
(45) Date of Patent: Feb. 27, 2024

(54) SYSTEM AND METHOD FOR DESULFURIZATION OF HYDROCARBON FUELS

(71) Applicant: Alternative Petroleum Technologies, Inc., Reno, NV (US)

(72) Inventors: Jack Lawrence Waldron, Reno, NV (US); Kylen J. Smith, Reno, NV (US)

(73) Assignee: Alternative Environmental Technologies Sulfex Corp., Auburn, WA (US)

( * ) Notice: Subject to any disclaimer, the term of this patent is extended or adjusted under 35 U.S.C. 154(b) by 0 days.

(21) Appl. No.: 17/578,327

(22) Filed: Jan. 18, 2022

(65) Prior Publication Data
US 2022/0251457 A1    Aug. 11, 2022

Related U.S. Application Data (60) Provisional application No. 63/138,431, filed on Jan. 16, 2021.

(51) Int. Cl.
*C10G 27/12* (2006.01)
*B01J 14/00* (2006.01)
*B01J 19/24* (2006.01)

(52) U.S. Cl.
CPC ............ *C10G 27/12* (2013.01); *B01J 14/00* (2013.01); *B01J 19/242* (2013.01); *B01J 19/246* (2013.01); *B01J 2219/00006* (2013.01); *B01J 2219/00033* (2013.01); *B01J 2219/00479* (2013.01); *B01J 2219/3325* (2013.01)

(58) Field of Classification Search
CPC ........ B01J 14/00; B01J 19/242; B01J 19/245; B01J 19/246; B01J 2219/00479; B01J 2219/3325; B01J 2219/0033; B01J 2219/00006; B01J 2219/00047; B01J 2219/182; B01J 2219/185; C10G 27/12
See application file for complete search history.

(56) References Cited

U.S. PATENT DOCUMENTS 9,458,068 B2 * 10/2016  Kuzmin .................... C07C 7/10
10,533,141 B2 * 1/2020  Moore .................... B01J 21/04

FOREIGN PATENT DOCUMENTS

| KR | 20140064669 A | 5/2014 |
|---|---|---|
| WO | 1992008771 A1 | 5/1992 |
| WO | 2013120551 A1 | 8/2013 |

* cited by examiner

*Primary Examiner* — Lessanework Seifu
(74) *Attorney, Agent, or Firm* — The Watson IP Group, PLC; Jovan N. Jovanovic (57) ABSTRACT

A reaction column comprises a plurality of cells each of which has a lower cell portion and an upper cell portion. The cells are arranged sequentially, from an uppermost cell to a lowermost cell. The fuel inlet is configured to direct fluid through the reaction column from a lower cell portion of the lowermost cell to an upper cell portion of the uppermost cell, and out of the fuel outlet. The reagent inlet is configured to direct reagent through the reaction column from the upper cell portion of the uppermost cell to the lower cell portion of the lowermost cell. The plurality of cells may be vertically or horizontally positioned, as well as inclined and the like. Systems and methods are likewise disclosed.

19 Claims, 6 Drawing Sheets

SYSTEM AND METHOD FOR DESULFURIZATION OF HYDROCARBON FUELS

CROSS-REFERENCE TO RELATED APPLICATION

This application claims priority from U.S. Patent App. Ser. No. 63/138,431, filed Jan. 16, 2021, entitled SYSTEM AND METHOD FOR DESULFURIZATION OF HYDROCARBON FUELS", the entire specification of which is hereby incorporated by reference in its entirety.

BACKGROUND OF THE DISCLOSURE

1. Field of the Disclosure

The disclosure relates in general to liquid hydrocarbon desulfurization, and more particularly, to a system and method for the oxidation of sulfur compounds in liquid hydrocarbons.

2. Background Art

Environmental concerns continue to increase with the increased use of hydrocarbon fuels, and have increased considerably with the use of these fuels in areas of the world where environmental regulations may not be as advanced as there are in other global locations.

One pollutant of hydrocarbon fuels is Sulfur, generally found in organic compounds such as thiophenes. Once combusted it becomes oxidized, that, when present in the atmosphere, has several deleterious effects. One of these effects is being a component of acid rain. Traditionally, the sulfur content of liquid hydrocarbons has been reduced by hydro-desulfurization, a process that requires relatively high temperatures and pressures in the presence of hydrogen gas to function economically. However, this technology is relatively costly, time consuming and expensive, which, in turn, limits the ability to rapidly assist countries in reducing Sulfur emissions.

Other methods have been developed for desulfurization. One of which is oxidative desulfurization, and another is bio oxidation. There are also drawbacks with these processes; overall they are promising. Among other drawbacks with oxidative desulfurization, it is difficult to efficiently use the reagents used during the oxidation step. The oxidizer is consumed in the reaction, and is quite costly. While in some systems, the oxidizer can be recycled, it remains difficult. Furthermore, there are operational issues associated with its implementation.

While the prior art is replete with patents directed to oxidative desulfurization, it has remained difficult to develop industrial processes for such innovations. Among other such prior art patents are U.S. Pat. No. 3,163,593 issued to Webster; U.S. Pat. No. 8,574,428 issued to Schucker; U.S. Pat. No. 7,758,745 issued to Cheng; U.S. Pat. No. 7,314,545 issued to Karas; U.S. Pat. No. 7,774,749 issued to Martinie; U.S. Pat. No. 6,596,914 issued to Gore; PCT Pub. No. WO2013/051202 published to Ellis and EP. App. Pub NO. 0482841 issued to Collins. Each of the foregoing patents is incorporated herein in its entirety.

Additionally, this application is related to U.S. Patent Application Ser. No. 62/471,159 filed Mar. 14, 2017, entitled "System and Method for Liquid Hydrocarbon Desulfurization", U.S. patent application Ser. No. 15/921,230 filed Mar. 14, 2018, entitled "System and Method for Liquid Hydrocarbon Desulfurization", U.S. patent application Ser. No. 16/922,631 filed Jul. 7, 2020, entitled "System and Method for Liquid Hydrocarbon Desulfurization," U.S. Patent Application Ser. No. 62/524,826 filed Jun. 26, 2017, entitled "System and Method for Liquid Hydrocarbon Desulfurization", U.S. patent application Ser. No. 16/019,441, entitled "System and Method for Liquid Hydrocarbon Desulfurization", U.S. Patent Application Ser. No. 62/623,562 filed Jan. 30, 2018, entitled "System and Method for Liquid Hydrocarbon Desulfurization", U.S. patent application Ser. No. 16/261,098, entitled "System and Method for Liquid Hydrocarbon Desulfurization", U.S. Patent Application Ser. No. 62/678,308, filed May 31, 2018, entitled "System And Method Of Liquid Hydrocarbon Desulfurization Utilizing A Liquid Sorbent", U.S. patent application Ser. No. 16/427,783, filed May 31, 2019, entitled "System And Method Of Liquid Hydrocarbon Desulfurization Utilizing A Liquid Sorbent", U.S. Patent Application Ser. No. 62/848,910, filed May 16, 2019, entitled "System and Method for Liquid Hydrocarbon Desulfurization", and U.S. patent application Ser. No. 16/877,348, filed May 18, 2020, entitled "System and Method for Liquid Hydrocarbon Desulfurization", the entire specification of each of which is hereby incorporated by reference in its entirety.

SUMMARY OF THE DISCLOSURE

In an aspect of the disclosure, the disclosure is directed to a reaction column comprising a plurality of cells, a fuel inlet and a reagent inlet. Each of the plurality of cells has a lower cell portion and an upper cell portion. The plurality of cells defining at least an uppermost cell and a lowermost cell. The upper cell portion of the lowermost cell having an outlet having fluid directable into an inlet of the lower cell portion of the uppermost cell. The lower cell portion of the uppermost cell having a reagent overflow that is coupled to an inlet of the upper cell portion of the lowermost cell. The fuel inlet is in fluid communication with the lower cell portion of the lowermost cell with a fuel outlet in communication with the upper cell portion of the uppermost cell. The reagent inlet is in fluid communication with the upper cell portion of the uppermost cell and a reagent outlet is in fluid communication with the lower cell portion of the lowermost cell. The fuel inlet is configured to direct fluid through the reaction column from the lower cell portion of the lowermost cell to the upper cell portion of the uppermost cell, and out of the fuel outlet. The reagent inlet is configured to direct reagent through the reaction column from the upper cell portion of the uppermost cell to the lower cell portion of the lowermost cell.

In some configurations, the lower cell portion of the uppermost cell and the lowermost cell includes an intermixing member is structurally configured to intermix the reagent that is proceeding from the uppermost cell to the lowermost cell with fuel that is proceeding from the lowermost cell to the uppermost cell.

In some configurations, the intermixing member comprises a venturi that is positioned in the lower cell portion.

In some configurations, the intermixing member comprises a manifold structure having openings for fuel to be extended therethrough positioned in the lower cell portion.

In some configurations, the intermixing member comprises a shear plate positioned in a recirculation loop that communicates with the upper cell portion and the lower cell portion of adjacent cells.

In some configurations, the intermixing member comprises a retaining vessel portion having a feeder pipe coupled thereto.

In some configurations, the feeder pipe provides communication between the lower cell portion and the upper cell portion.

In some configurations, the plurality of cells is formed into a substantially cylindrical configuration having a circular cross-sectional configuration.

In some configurations, the reaction column further comprises at least one central cell that is positioned between the uppermost and the lowermost cell. The central cell having a lower cell portion and an upper cell portion. The lower cell portion is coupled to the upper cell portion of a first adjacent cell adjacent cell. The upper cell portion is coupled to the lower cell portion of a second adjacent cell adjacent cell opposite the at least one central cell from the first adjacent cell. In such a configuration, the cells are sequentially oriented from the uppermost cell, through sequential central cells and finally with the lowermost cell (whether in a vertical, horizontal or other configuration, it will be understood that uppermost to lowermost pertains to the direction of travel of the reagent, whereas the fuel travels from the lowermost to the uppermost cell and through the central cells sequentially therebetween).

In some configurations, the at least one central cell comprises a plurality of central cells.

In some configurations, the plurality of cells comprises between five and fifteen cells.

In some configurations, at least some of the plurality of cells are stacked vertically.

In some configurations, each of the cells is stacked vertically.

In some configurations, the cells are positioned so that the reagent travels from an uppermost to a lowermost cell by way of gravity.

In some configurations, at least the upper cell portion of at least one of the plurality of cells is formed from one of a transparent and a translucent material.

In another aspect of the disclosure, a system is formed by a plurality of reaction columns positioned in a parallel arrangement.

In an aspect of the disclosure, a method of hydrocarbon desulfurization is disclosed that has the steps of: providing a plurality of cells including a lower cell portion and an upper cell portion, the cells defining an uppermost cell and a lowermost cell; directing reagent in a downward from the uppermost cell to the lowermost cell; maintaining at least some reagent in the lower cell portion or each of the uppermost and lowermost cell; introducing fuel to the lower cell portion of the lowermost cell; mixing fuel with reagent in the lower cell portion of the lowermost cell; directing fuel into the upper cell portion of the lowermost cell; directing fuel into the lower cell portion of the uppermost cell; mixing fuel with reagent in the lower cell portion of the uppermost cell; directing fuel into the upper cell portion of the uppermost cell; removing fuel at or near an upper end of the upper cell portion of the uppermost cell; overflowing reagent in the lower cell portion of the uppermost cell into the upper cell portion of the lowermost cell; overflowing reagent in the lower cell portion of the lowermost cell; and removing the reagent that has overflowed from the lower cell portion of the lowermost cell.

In some configurations of the method, a plurality of central cells is positioned between the uppermost cell and the lowermost cell, with the reagent traveling from the uppermost cell to the lowermost cell sequentially, and the fuel traveling from the lowermost cell to the uppermost cell sequentially.

In some configurations, the reagent travels from the uppermost cell to the lowermost cell by way of gravity.

In some configurations, the plurality of cells define a reaction column that is vertically oriented.

In another aspect of the disclosure, the disclosure is directed to a system comprising a reaction column; and a pump coupled to a fuel inlet of a lowermost cell structurally configured to pump fuel into the lowermost cell.

In some configurations, a pump is further coupled to the inlet of the uppermost cell and structurally configured to pump reagent into the uppermost cell.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
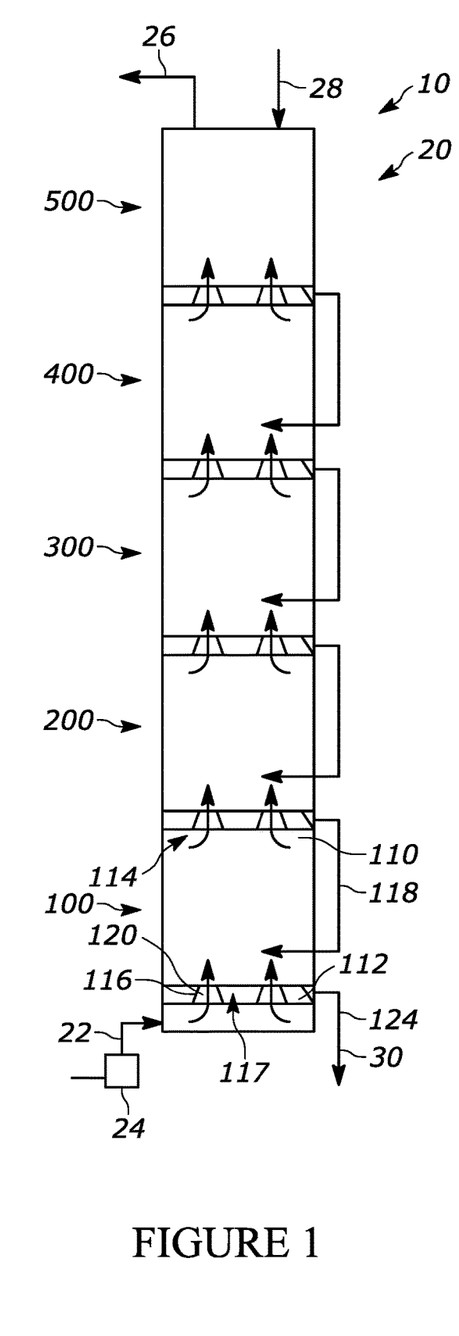
FIG. 1 of the drawings is a schematic representation of a reaction column of the present disclosure.

Referring now to the drawings and in particular to FIG. 1, a system and method for desulfurization of hydrocarbon fuels is shown at 10. The desulfurization system is configured to remove sulfur content from liquid hydrocarbons, such as, for example, kerosene, diesel, fuel oil, jet fuel, gasoline, among others. The system is not limited to use with any particular type of liquid hydrocarbon. Additionally, it is contemplated that the system can lower the sulfur content to below 15 ppm, to for example 2 ppm, or less. Often times, the starting hydrocarbon has a sulfur content that can be 1500 or higher, while the system is contemplated for use with starting liquid hydrocarbon that is in excess of 15 ppm, and generally in excess of 100 ppm, 200 ppm, 300 ppm, 400 ppm, 500 ppm, 600 ppm, 700 ppm, 800 ppm, 900 ppm, and on upwards of 1500 ppm or greater. Again, the system is not limited to use with any particular hydrocarbon, or a hydrocarbon with any particular sulfur content.

The processing unit utilizes an aqueous feed, which is also sometimes referred to herein as the reagent. The aqueous feed may comprise any number of different formulations. In some configurations, the aqueous feed may comprise combinations of an organic acid, an oxidizer (also referred to herein as an oxidant), a strong acid, a metal ion (preferably, highly oxidized) and, optionally, an ionic liquid. The particular ratios can be varied depending on the particular fuel type and the composition thereof. The organic acid may comprise any one of the following, without limitation, acetic, formic, benzoic, or other acid of the carboxylic family, as well as mixtures of the same. The oxidizer (oxidant) may include peroxide which can be hydrogen peroxide or an organic peroxide, such as meta-chloroperoxybenzoic acid, or a solid oxidizer such as Oxone. The strong acid can be either sulfuric or nitric. The metal ion may be Iron ions, Magnesium ions, among others, either singly or in combination. The foregoing metal ions, oxidant, acids and other constituents is not exhaustive, but are illustrative examples, as one of ordinary skill having the present disclosure would understand variations within the scope of the disclosure. Additionally, the disclosure is not limited to these particular acids. Additionally, it is contemplated that an ionic liquid may be fully omitted from some configurations.

The system includes a reaction column 20. The reaction column 20 includes a fuel inlet 22, a fuel pump 24, a treated fuel outlet 26, a reagent inlet 28, a reagent outlet 30 and a plurality of cells, such as cell 100 in a vertically stacked orientation, wherein each successive cell is oriented in a vertically upward direction (in the configuration shown, they are directly vertically oriented, whereas in other configurations, they may be offset from each other, or, as described and shown, the column may be split into a plurality of horizontal cells). It will be understood that the number of cells can be varied, and that a total of five cells are shown, namely cells 100, 200, 300, 400 and 500. There may be as few as two cells or as many cells as is necessary to achieve the desired reduction of sulfur (which may be on the order of six, seven, eight, nine, ten, twelve, twenty, thirty or more cells. The cells may be arranged one after another, or they may be arranged separately, or they may be divided in different manners. Additionally, each cell may include a plurality of cells that may be positioned in a side by side configuration, as will be understood by those of skill in the art. It will be understood that in a configuration of at least a plurality of cells, a lowermost and an uppermost cell is defined. When there are further cells, those cells are positioned between the lowermost and the uppermost cells and comprise central cells that are sequentially coupled between the uppermost cell and the lowermost cell. Cells that are positioned side by side can likewise bet termed uppermost and lowermost cells, with the uppermost to lowermost being defined by the direction of travel of reagent through the cells (i.e., in a first to last cell determined by the direction of flow of reagent through the cells.

Figure 11:
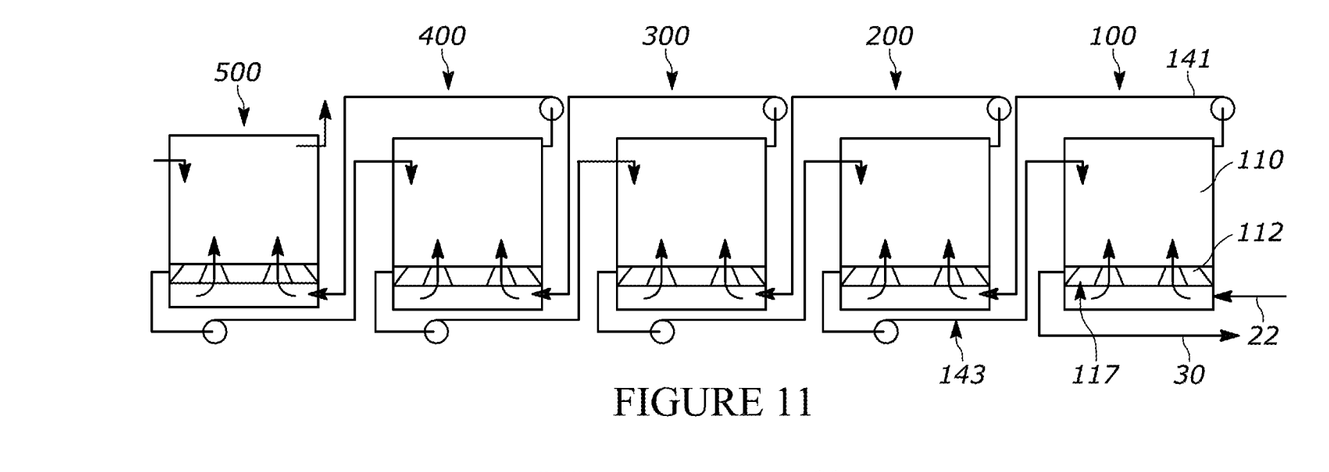
FIG. 11 of the drawings is a schematic representation of a configuration a reaction column (oriented in a substantially horizontal direction, which may be inclined or declined or substantially horizontal)

Furthermore, instead of being generally vertical (i.e., utilizing gravity from cell to cell), the cells can be positioned horizontally, substantially horizontally, inclined or declined. One such example is shown in FIG. 11 as comprising a generally horizontal configuration. In such a configuration, in pumps may be utilized to direct reagent and fuel through the cells. In this configuration, like structures have the same reference numbers as those in FIG. 1.

The fuel inlet 22 introduces fuel into a lower (if not the lowest) one of the plurality of cells. The fuel inlet 24 may be coupled to a fuel pump 24 so as to control the rate of fuel into the reaction column 20. The treated fuel outlet 26 is positioned at an upper (if not the uppermost) one of the plurality of cells to withdraw fuel from the column. It will be understood that the treated fuel outlet includes oxidized species of sulfur in the fuel, which can be removed through different scrubbing or oxidation removal techniques known to those of skill in the art.

The reagent inlet 28 is positioned at the upper (if not the uppermost) one of the plurality of cells so as to provide reagent (the aqueous disclosed above) into the column. The reagent outlet 30 is positioned at the lower (if not the lowest) one of the plurality of cells so as to remove reagent from the reaction column 20. It will be understood that the reagent that is removed through the reagent outlet may be reprocessed (i.e., additional oxidizer, weak acid and/or strong acid may be added, at which time it may be recirculated to the reagent inlet 28). In other configurations, the reagent collected at the reagent outlet 30 may be removed and not reused. In many instances, it is only necessary to add further oxidizer to the reagent that is collected, at which time it may be recirculated.

The plurality of cells will be described with respect to cell 100 with the understanding that the remaining cells are substantially identical or substantially similar having components that are substantially similar to those identified with respect to cell 100. It will further be understood that the cells may have some physical differences, or component differences while being within the scope of the present disclosure. Oxidation preferably occurs of at least some species of sulfur within the fuel through each one of the cells.

Cell 100 of the reaction column 20 includes upper cell portion 110, lower cell portion 112, upper outlet 114 and lower inlet 116. The upper cell portion 110 and the lower cell portion 112 define a volume. The upper cell portion includes an overflow inlet 118 which provides an inlet of the aqueous fluid from another one of the cells (preferably a cell that is vertically after the cell 100, or directly sequentially vertically adjacent to the cell 100). It will be understood that the height (along with the cross-sectional area, and flow rates among other factors, determines the time in which the fuel (with reagent) is mixed within the upper cell portion 110 (after mixing in the lower cell portion 112).

Figure 3:
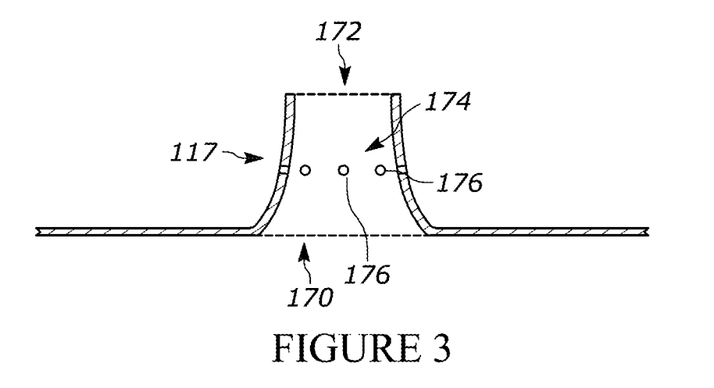
FIG. 3 of the drawings is a cross-sectional view of a configuration of the mixing structure (venturi) that is shown in the reaction column of the present disclosure shown in FIG. 1.
Figure 4:
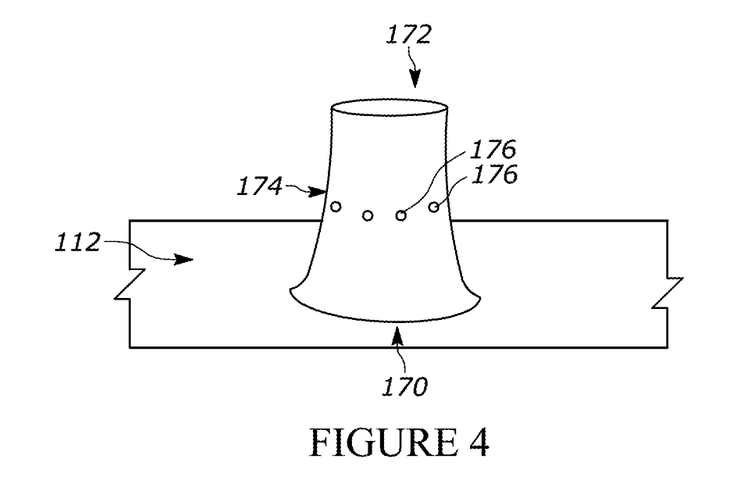
FIG. 4 of the drawings is a perspective view of a configuration of the mixing structure that is shown in the reaction column of the present disclosure shown in FIG. 1.

The lower cell portion 112 includes retaining region 120 and overflow outlet 124. The lower cell portion allows for the collection of reagent (aqueous feed), and facilitates the passage of fuel into the lower inlet 116 so as to go through the reagent and/or intermixes the fuel and the reagent (which may comprise a variety of different intermixing members 117, which comprises structures to provide for the intermixing of constituent and fuel, such as a venturi or other intermixing configurations (such as that shown in FIGS. 3, 4, 6-10)). In particular, a venturi is shown in FIGS. 3 and 4 as comprising an inlet 170 and an outlet 172 with a narrowing section 174, and a reagent inlet 176 (series of openings) positioned at the narrowing section. As one of skill would understand, the configuration will draw in the reagent through the reagent inlet. Other manifold mixing systems, such as, for example, a manifold system that includes small openings through which the fuel can be directed into reagent are contemplated for use as a intermixing member 117.

As the reagent reaches a level within the lower cell, further reagent is directed through the overflow outlet 124. The overflow outlet 124 is coupled to the overflow inlet of an upper cell portion of another cell (and often a cell that is lower vertically (or immediately lower)).

The lower inlet 116 of the lowermost cell 100 is coupled to the fuel inlet 22. The lower inlet of the final cell, cell 500 in the present configuration, is coupled to the treated fuel outlet 26. The remaining lower inlets of the other cells are coupled to the upper outlet of a preceding cell (for example, the immediately preceding cell, preferably).

Figure 2:
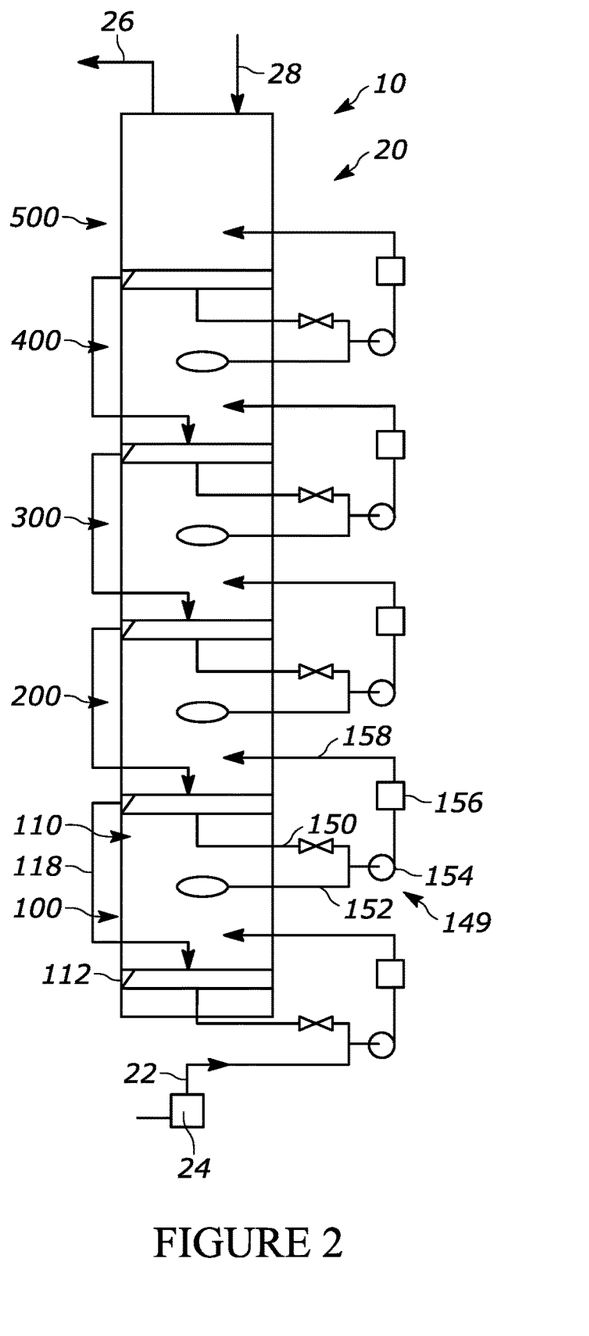
FIG. 2 of the drawings is a schematic representation of a reaction column of the present disclosure, showing an exemplary agitation system incorporated therein.

In some configurations, such as the configuration of FIG. 2, an agitation assembly 149 can be added to each of or some of the cells. For example, the recirculation system includes a first inlet 150, a second inlet 152, a pump 154, an agitator/mixer 156 and an outlet 158. In the configuration shown, the first inlet is coupled to a lower cell portion of a cell of the plurality of cells. The second inlet is coupled to the upper cell portion of a cell of the plurality of cells. In the configuration shown, the first inlet is attached to a lower cell portion of a cell that is vertically subsequent from the cell to which the second inlet 152 is attached. It will be understood that valves may be utilized to control the flow rates through either one or both of the first inlet and the second inlet. The pump 154 directs fluid from the inlets through the agitator/mixer. In the configuration shown, the shear mixer may be a shear plate of the type disclosed in U.S. Pat. No. 8,192,073 entitled "Mixing Apparatus and Method for Manufacturing an Emulsified Fuel" issued Jun. 5, 2012, the entire disclosure of which is incorporated herein by reference in its entirety. In the configuration shown, the outlet 158 (i.e., the mixed constituents from the first inlet and the second inlet) is directed to the upper cell portion of the cell to which the first inlet is coupled.

It will be understood that with the agitation system 149, a number of variations are contemplated. For example, the first and second inlets can be varied to gather reagent from a different or a same cell as the second inlet is collecting fuel. Additionally, the outlet may be directed to any number of different upper cell portions, or may be introduced at or near a lower inlet of any one of the plurality of cells. Additionally, while it is disclosed that there is an agitation system associated with each one of the cells, it is contemplated that the agitation system may be associated with only some of the cells. Additionally, the recirculation system may include a plurality of inlets associated with only a single pump and agitator/mixer and with a single outlet, or, multiple first inlets, second inlets and outlets may be utilized and coupled to multiple upper and lower regions of the different cells.

Figure 12:
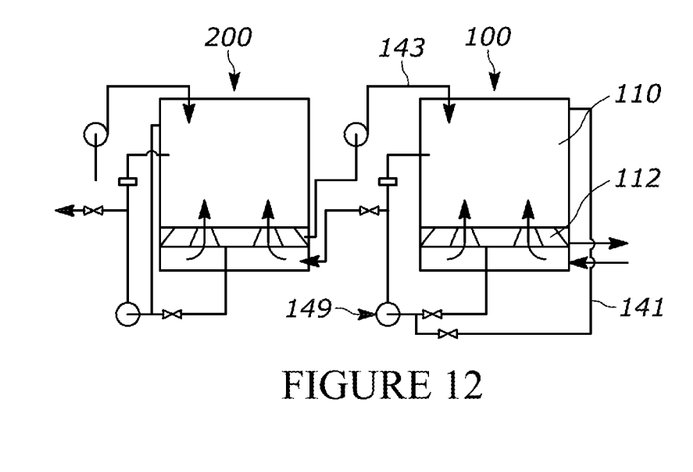
FIG. 12 of the drawings is a schematic representation of a reaction column of the present disclosure, (likewise oriented in a horizontal direction, which may be inclined or declined or substantially horizontal), showing an exemplary agitation system incorporated therein.

Furthermore, instead of being generally vertical (i.e., utilizing gravity from cell to cell), the cells can be positioned horizontally, substantially horizontally, inclined or declined, and with agitation. One such example is shown in FIG. 12 as comprising a generally horizontal configuration. In such a configuration, in pumps may be utilized to direct reagent and fuel through the cells, and the recirculation system may be further employed. In this configuration, like structures have the same reference numbers as those in FIG. 2.

Figure 5:
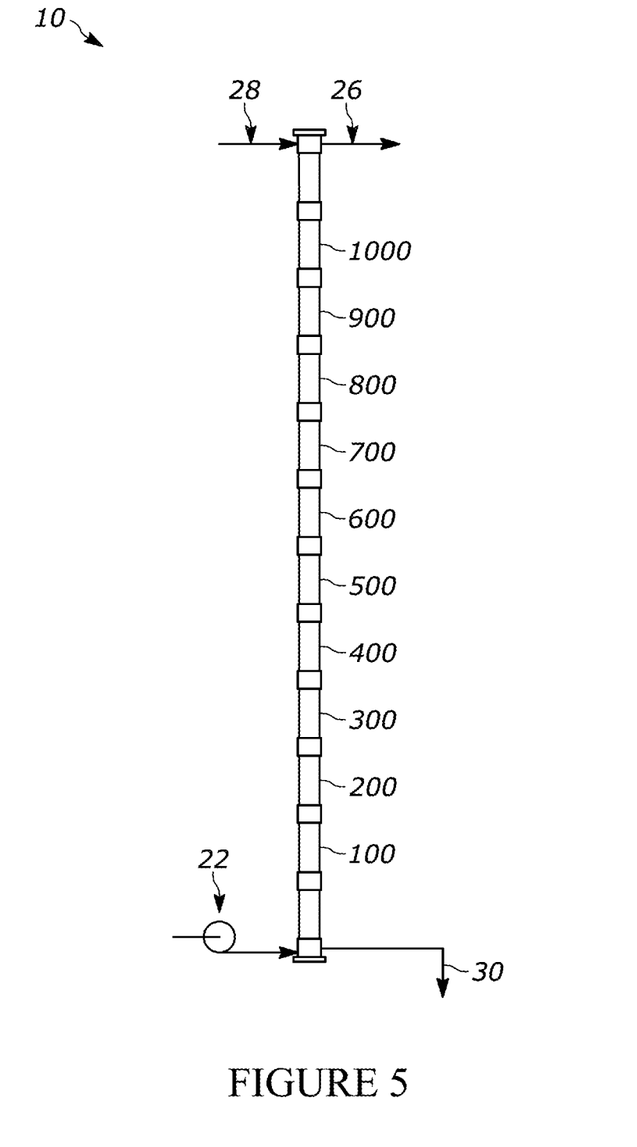
FIG. 5 of the drawings is a schematic representation of a reaction column of the present disclosure, showing ten cells.
Figure 6:
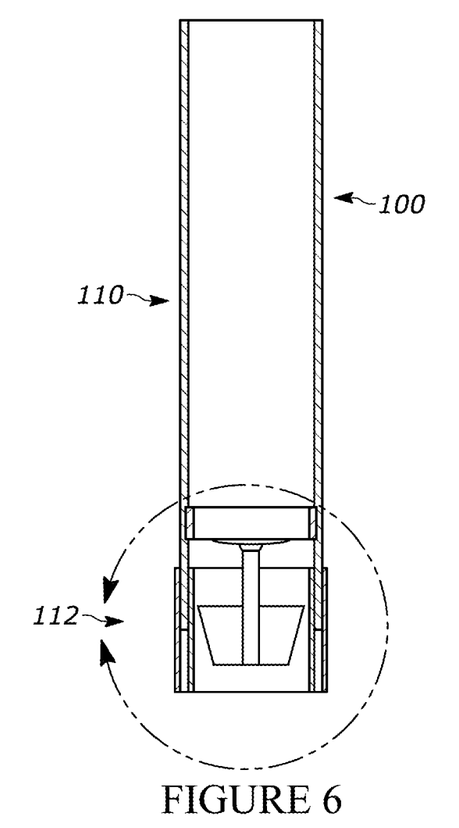
FIG. 6 of the drawings is a side view of a cell of the schematic representation of the reaction column of FIG. 5.
Figure 7:
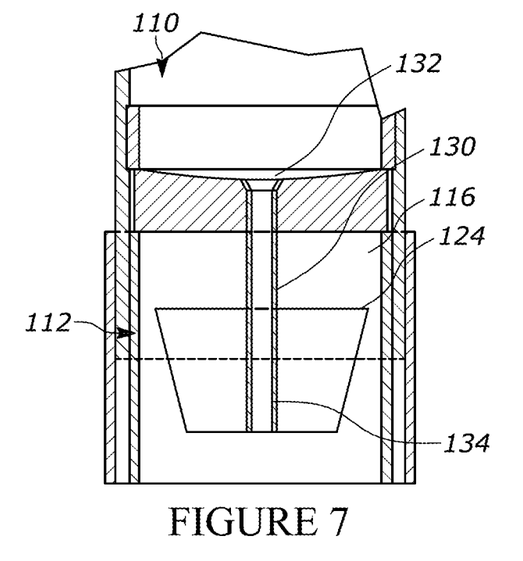
FIG. 7 of the drawings is a cross-sectional view of the lower cell portion thereof.

With reference to FIGS. 5 through 7 (and FIGS. 8 through 10), a configuration of the reaction column having 10 cells (100-1000) is shown. In such a configuration, the cross-sectional configuration of the reaction column is substantially circular (and may be formed from a polymer, and, for example a transparent or translucent polymer material). Like reference numbers are utilized for the different structures of the reaction column. It will be understood that the capacity of such a reaction column can be varied by varying the diameter of the reaction column, as well as the relative heights of the cell components, flow rates of reagent and fuel. Moreover, it will be understood that a plurality of such reaction columns can be positioned in a parallel arrangement.

Figure 8:
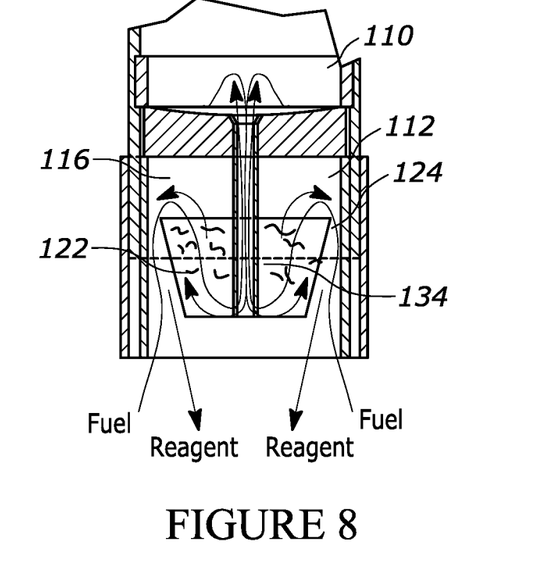
FIG. 8 of the drawings is a cross-sectional schematic representation of a sample configuration, of a number of different configurations, of a portion of a cell of the reaction column of the present disclosure, showing a configuration of the lower cell portion and the passage from the upper cell portion to the lower cell portion thereof.
Figure 9:
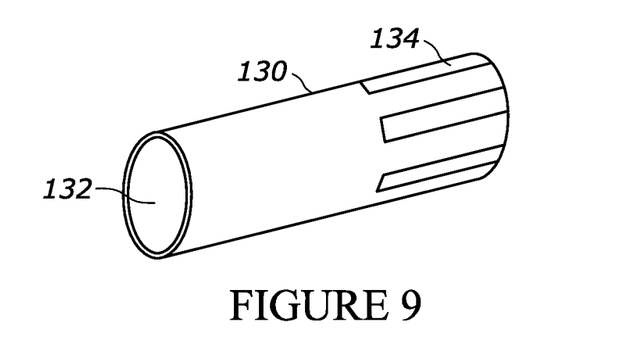
FIG. 9 of the drawings is a side elevational view of an exemplary configuration of a lower cell portion of a reaction column of the present disclosure.
Figure 10:
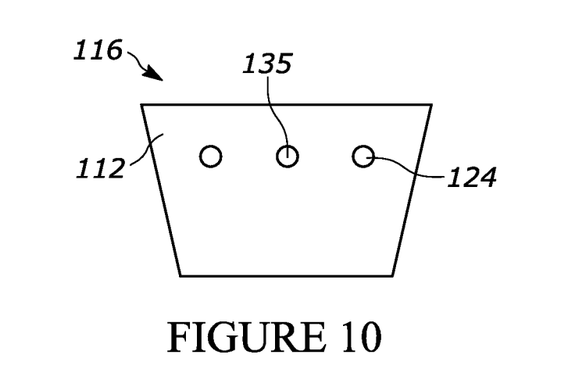
FIG. 10 of the drawings is a perspective view of a feeder pipe of the present disclosure.

With reference to FIGS. 8 through 10, a configuration of the lower cell portion is shown. The lower cell portion (which may be utilized on any one of the cells or all of the cells, or some of the cells) includes retaining vessel portion 120, reagent bed 122, and overflow outlet 124. The lower cell portion is in fluid communication with the upper cell through feeder pipe 130 which includes upper opening 132, and lower opening which defines a plurality of slots 134. The lower inlet 114 directs fluid into the lower cell portion, and the openings 135 define an overflow outlet 124 which extends into the next lower upper cell portion and defines an overflow inlet 118. The same reference numbers for similar components are utilized in FIGS. 5 through 7. It will be understood that in some configurations, the overflow outlet may comprise the upper rim of the retaining vessel portion, and openings such as those shown in FIGS. 8 through 10 can be omitted.

In operation, and with reference to FIG. 1, fuel is directed at a desired flow rate from the fuel inlet 22 into the lower cell portion 112 of the cell 100. Reagent is directed through the reagent inlet 28 (in a steady state, the lower cell portions of each of the cells are filled to a desired level with the reagent). As further reagent is introduced and desired levels are reached in each lower cell portion, additional reagent is directed through the overflow outlets 134 and into the overflow inlet 118 of a desired upper cell portion.

Fuel continues to be directed through the fuel inlet. Eventually this fuel passes through the lower cell portion of the cell 100 and intermixes with the aqueous/reagent that is positioned in the lower cell portion of cell 100. The hydrocarbon fuel and the aqueous/reagent mix and some oxidation of the sulfur constituents in the hydrocarbon fuel occurs. The fuel, having some aqueous continues to interact, oxidizing sulfur constituents in the hydrocarbon fuel. Due to the differences in the density, the hydrocarbon fuel (being less dense) rises, while the aqueous/reagent (being more dense) falls. This process continues as the fuel exits from the cell 100 and proceeds into the cell 200. The height of the upper cell portion can be varied so that the desired intermixing time between the reagent and the fuel within the cell can be achieved. Of course, it will be understood that the time of interaction is also varied through the varying of the flow rates of reagent and fuel, as well as the cross-sectional area of the cell, among other variables.

As the fuel proceeds through the lower cell portion of the cell 200 the nature and concentration of the aqueous/re-agents may be different than the configuration that was encountered in the cell 100. As such, some oxidation of the sulfur constituents in the hydrocarbon fuel occurs as the fuel mixes with the aqueous/reagents in the lower cell portion, and continues as these two are present in the upper cell portion.

This process is repeated through each of the cells of the plurality of cells. At the uppermost cell of the plurality of cells, the fuel exits through the treated fuel outlet (along with oxidized sulfur species). It will be understood that the oxidized sulfur species can be removed with an adsorbent or an absorbent, such as, for example, ethanol or methanol, among others. Similarly, the excess reagent that overflows the lower cell portion 112 of the cell 100 is directed out the reagent outlet for reprocessing, recycling and/or disposal.

With reference to FIG. 11, instead of the fuel being directed vertically from cell to cell by being pumped into the lowermost cell (or another cell as desired), in the configuration shown, the fuel is pumped via pump assembly 141 from the top of a cell downstream to the bottom of the cell upstream. The fuel then proceeds through the lower cell portion and subsequently through the upper cell portion. This continues upstream from cell to cell. At the same time, the reagent is directed into an upstream cell through, for example, pump assembly 143, and as the reagent overflows the lower cell portion, the reagent is pumped into a subsequent cell downstream, at or near the upper end thereof. This process continues sequentially to the downstream cells. Eventually, reagent is removed from a final one of the cells as fuel (with oxidized sulfur species) is removed from the ultimate upstream (or initial one of the cells, or an upstream cell) for removal of the oxidized sulfur species with an adsorbent or absorbent. Pumps can be utilized to control the flow of reagent and fuel through the cells.

It will be understood that in such a configuration, as well as in other configurations, reagent may be added as desired or as deemed necessary in any of the cells. Additionally, while five cells are shown in the horizontal configuration, it will be understood that a greater or lesser number of cells may be employed in such a configuration, and, also that a combination of vertical and horizontal configurations are likewise contemplated for use (that is, the horizontal configuration may include a plurality of structures of multiple cells each). Such a configuration would comprise a plurality of vertically configured cells in a horizontal configuration.

In the configuration of FIG. 2, additional agitation is achieved through the agitation system 149 associated with the different cells of the plurality of cells. Such agitation/mixing further facilitates the interaction and the reaction between the hydrocarbon fuel and the aqueous/reagents to oxidize the sulfur species that are within the hydrocarbon fuel.

Similarly, with respect to FIG. 12, agitation can be achieved through the use of a horizontal configuration. It will be understood that in the horizontal configuration, two cells are shown, with the understanding that more than two cells (i.e., 5-15, fewer than 5 or greater than 15) may be employed. Additionally, each horizontal cell may comprise a plurality of vertically stacked cells, similar to that which is described above with respect to the configuration of FIG. 11.

With reference to FIG. 8, an example of the flow of the hydrocarbon fuel and the reagent/aqueous through a lower cell portion and into an upper cell portion is shown. In such a configuration, aqueous/reagent is contained within the lower cell portion 112 and additional reagent is fed (preferably by gravity) through the feeder pipe 130 that separates the upper cell portion from the lower cell portion. If the aqueous reaches a certain level, further aqueous/reagent is directed through the openings which define the overflow outlet and the overflow inlet of the upper cell portion of the immediately upstream cell (with the understanding that upstream and downstream are defined by the path of the fuel).

At the same time, fuel is directed from the upper cell portion of a downstream cell to the lower cell portion of the subsequent cell through the lower inlet. The fuel proceeds in the opposite direction of the aqueous/reagent, but both must pass through the lower cell portion thereby allowing for intermixing. The fuel passes through the feeder pipe and into the upper cell portion. It will be understood that this is merely an exemplary configuration of the upper cell portions and the lower cell portions, and that a number of variations are contemplated.

It will further be understood that, preferably, the oxidation of sulfur constituents within the hydrocarbon fuel continue as the fuel is processed through the successive cells and that the fuel at the treated fuel outlet has a lower sulfur constituent level (i.e., ppm once the oxidized sulfur is removed) than when introduced into the lowermost cell. It is believed that further reduction can be observed through the providing of additional cells that can be added to the reaction column. It is further understood that additional constituents may be added at various stages of the process (for example, additional oxidizer, acids, among other constituents of the aqueous/oxidizer). It is also contemplated that the same reagent, without any additions or removals proceeds from cell to cell from the upper cells to the lower cells. It is also contemplated that the aqueous/reagents can be removed and recycled at a point prior to the final cell, and that new aqueous/reagents can be introduced to a cell other than the uppermost cell. Such variations are within the scope of the present disclosure.

It will further be understood that the system and method can operate in a continuous manner, wherein fuel is directed into the inlet at a predetermined rate, and the reagent is directed into the inlet at a predetermined rate. In other configurations, the system may be operated in a batched manner.

It will be understood that the fuel can be directed into the system by way of a pump, and the reagent can be directed into the system by way of a pump. In other configurations, the reagent can be directed into the system utilizing a gravity feed with, for example, a valve that can meter the reagent.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A reaction column comprising:
   a plurality of cells, each cell comprising a lower cell portion and an upper cell portion, the plurality of cells defining at least an uppermost cell and a lowermost cell, the upper cell portion of the lowermost cell having an outlet having fluid directable into an inlet of the lower cell portion of the uppermost cell, and with the lower cell portion of the uppermost cell having a reagent overflow that is coupled to an inlet of the upper cell portion of the lowermost cell;

at least one central cell that is positioned between the uppermost and the lowermost cell, with the central cell having a lower cell portion and an upper cell portion, the lower cell portion coupled to the upper cell portion of a first adjacent cell adjacent cell with the upper cell portion coupled to the lower cell portion of a second adjacent cell adjacent cell opposite the at least one central cell from the first adjacent cell;

a fuel inlet is in fluid communication with the lower cell portion of the lowermost cell with a fuel outlet in communication with the upper cell portion of the uppermost cell;

a reagent inlet is in fluid communication with the upper cell portion of the uppermost cell and a reagent outlet is in fluid communication with the lower cell portion of the lowermost cell;

wherein, the fuel inlet is configured to direct fluid through the reaction column from the lower cell portion of the lowermost cell to the upper cell portion of the uppermost cell, and out of the fuel outlet, and while the reagent inlet is configured to direct reagent through the reaction column from the upper cell portion of the uppermost cell to the lower cell portion of the lowermost cell.

2. The reaction column of claim 1 wherein the lower cell portion of the uppermost cell and the lowermost cell includes an intermixing member structurally configured to intermix the reagent that is proceeding from the uppermost cell to the lowermost cell with fuel that is proceeding from the lowermost cell to the uppermost cell.

3. The reaction column of claim 2 wherein the intermixing member comprises a venturi that is positioned in the lower cell portion.

4. The reaction column of claim 2 wherein the intermixing member comprises a manifold structure having openings for fuel to be extended therethrough positioned in the lower cell portion.

5. The reaction column of claim 2 wherein the intermixing member comprises a shear plate positioned in a recirculation loop that communicates with the upper cell portion and the lower cell portion of adjacent cells.

6. The reaction column of claim 2 wherein the intermixing member comprises a retaining vessel portion having a feeder pipe coupled thereto.

7. The reaction column of claim 6 wherein the feeder pipe provides communication between the lower cell portion and the upper cell portion.

8. The reaction column of claim 1 wherein the plurality of cells is formed into a substantially cylindrical configuration having a circular cross-sectional configuration.

9. The reaction column of claim 1 wherein the at least one central cell comprises a plurality of central cells.

10. The reaction column of claim 9 wherein the plurality of cells comprises between five and fifteen cells.

11. The reaction column of claim 1 wherein at least some of the plurality of cells are stacked vertically.

12. The reaction column of claim 11 wherein each of the cells is stacked vertically.

13. The reaction column of claim 12 wherein the cells are positioned so that the reagent travels from an uppermost to a lowermost cell by way of gravity.

14. The reaction column of claim 11 wherein at least the upper cell portion of at least one of the plurality of cells is formed from one of a transparent and a translucent material.

15. A system formed by a plurality of reaction columns of claim 1 positioned in a parallel arrangement.

16. A reaction column comprising:

a plurality of cells, each cell comprising a lower cell portion and an upper cell portion, the plurality of cells defining at least an uppermost cell and a lowermost cell, the upper cell portion of the lowermost cell having an outlet having fluid directable into an inlet of the lower cell portion of the uppermost cell, and with the lower cell portion of the uppermost cell having a reagent overflow that is coupled to an inlet of the upper cell portion of the lowermost cell;

a fuel inlet is in fluid communication with the lower cell portion of the lowermost cell with a fuel outlet in communication with the upper cell portion of the uppermost cell;

a reagent inlet is in fluid communication with the upper cell portion of the uppermost cell and a reagent outlet is in fluid communication with the lower cell portion of the lowermost cell;

wherein, the fuel inlet is configured to direct fluid through the reaction column from the lower cell portion of the lowermost cell to the upper cell portion of the uppermost cell, and out of the fuel outlet, while the reagent inlet is configured to direct reagent through the reaction column from the upper cell portion of the uppermost cell to the lower cell portion of the lowermost cell;

wherein the lower cell portion of the uppermost cell and the lowermost cell includes an intermixing member structurally configured to intermix the reagent that is proceeding from the uppermost cell to the lowermost cell with fuel that is proceeding from the lowermost cell to the uppermost cell; and wherein the intermixing member comprises a venturi that is positioned in the lower cell portion.

17. A reaction column comprising:

a plurality of cells, each cell comprising a lower cell portion and an upper cell portion, the plurality of cells defining at least an uppermost cell and a lowermost cell, the upper cell portion of the lowermost cell having an outlet having fluid directable into an inlet of the lower cell portion of the uppermost cell, and with the lower cell portion of the uppermost cell having a reagent overflow that is coupled to an inlet of the upper cell portion of the lowermost cell;

a fuel inlet is in fluid communication with the lower cell portion of the lowermost cell with a fuel outlet in communication with the upper cell portion of the uppermost cell;

a reagent inlet is in fluid communication with the upper cell portion of the uppermost cell and a reagent outlet is in fluid communication with the lower cell portion of the lowermost cell;

wherein, the fuel inlet is configured to direct fluid through the reaction column from the lower cell portion of the lowermost cell to the upper cell portion of the uppermost cell, and out of the fuel outlet, while the reagent inlet is configured to direct reagent through the reaction column from the upper cell portion of the uppermost cell to the lower cell portion of the lowermost cell;

wherein the lower cell portion of the uppermost cell and the lowermost cell includes an intermixing member structurally configured to intermix the reagent that is proceeding from the uppermost cell to the lowermost cell with fuel that is proceeding from the lowermost cell to the uppermost cell; and wherein the intermixing member comprises a shear plate positioned in a recirculation loop that communicates with the upper cell portion and the lower cell portion of adjacent cells.

18. A reaction column comprising:

a plurality of cells, each cell comprising a lower cell portion and an upper cell portion, the plurality of cells defining at least an uppermost cell and a lowermost cell, the upper cell portion of the lowermost cell having an outlet having fluid directable into an inlet of the lower cell portion of the uppermost cell, and with the lower cell portion of the uppermost cell having a reagent overflow that is coupled to an inlet of the upper cell portion of the lowermost cell;

a fuel inlet is in fluid communication with the lower cell portion of the lowermost cell with a fuel outlet in communication with the upper cell portion of the uppermost cell;

a reagent inlet is in fluid communication with the upper cell portion of the uppermost cell and a reagent outlet is in fluid communication with the lower cell portion of the lowermost cell;

wherein, the fuel inlet is configured to direct fluid through the reaction column from the lower cell portion of the lowermost cell to the upper cell portion of the uppermost cell, and out of the fuel outlet, and while the reagent inlet is configured to direct reagent through the reaction column from the upper cell portion of the uppermost cell to the lower cell portion of the lowermost cell;

wherein each of the cells is stacked vertically; and wherein the cells are positioned so that the reagent travels from an uppermost to a lowermost cell by way of gravity.

19. A reaction column comprising:

a plurality of cells, each cell comprising a lower cell portion and an upper cell portion, the plurality of cells defining at least an uppermost cell and a lowermost cell, the upper cell portion of the lowermost cell having an outlet having fluid directable into an inlet of the lower cell portion of the uppermost cell, and with the lower cell portion of the uppermost cell having a reagent overflow that is coupled to an inlet of the upper cell portion of the lowermost cell;

a fuel inlet is in fluid communication with the lower cell portion of the lowermost cell with a fuel outlet in communication with the upper cell portion of the uppermost cell;

a reagent inlet is in fluid communication with the upper cell portion of the uppermost cell and a reagent outlet is in fluid communication with the lower cell portion of the lowermost cell;

wherein, the fuel inlet is configured to direct fluid through the reaction column from the lower cell portion of the lowermost cell to the upper cell portion of the uppermost cell, and out of the fuel outlet, and while the reagent inlet is configured to direct reagent through the reaction column from the upper cell portion of the uppermost cell to the lower cell portion of the lowermost cell;

wherein at least some of the plurality of cells are stacked vertically; and wherein at least the upper cell portion of at least one of the plurality of cells is formed from one of a transparent and a translucent material.

* * * * *